(12) United States Patent
Schmeichel

(10) Patent No.: US 6,959,848 B2
(45) Date of Patent: Nov. 1, 2005

(54) TAILGATE SEALING GASKET

(75) Inventor: Charles M. Schmeichel, Jamestown, ND (US)

(73) Assignee: Agri-Cover, Inc., Jamestown, ND (US)

( * ) Notice: Subject to any disclaimer, the term of this patent is extended or adjusted under 35 U.S.C. 154(b) by 0 days.

(21) Appl. No.: 10/872,036

(22) Filed: Jun. 18, 2004

(65) Prior Publication Data
US 2005/0006919 A1    Jan. 13, 2005

Related U.S. Application Data

(63) Continuation of application No. 10/251,284, filed on Sep. 20, 2002, now Pat. No. 6,773,019, which is a continuation of application No. 09/590,547, filed on Jun. 8, 2000, now Pat. No. 6,474,654.

(51) Int. Cl.$^7$ ............................. B60J 10/08; F16J 15/00
(52) U.S. Cl. ........................ 226/50; 277/645; 277/921; 296/146.9
(58) Field of Search .......................... 296/26.11, 27.1, 296/107.04, 50, 57.1, 146.9; 277/630, 637, 277/641, 644, 645, 650, 921, 312, 316

(56) References Cited

U.S. PATENT DOCUMENTS

| | | |
|---|---|---|
| 1,998,791 A | 4/1935 | Schanz |
| 2,156,681 A | 5/1939 | Dewhirst et al. |
| 2,705,655 A | 4/1955 | Brown et al. |
| 2,910,209 A | 10/1959 | Nelson |
| 3,026,367 A | 3/1962 | Hartwell |
| 3,065,517 A | 11/1962 | Dower |
| 3,165,793 A | 1/1965 | Lynch |
| 3,357,137 A | 12/1967 | Lombardi et al. |
| 3,381,988 A * | 5/1968 | Dewar .......................... 52/716.3 |
| 3,501,868 A | 3/1970 | Ganzinotti |
| 3,641,707 A * | 2/1972 | Kellos ........................... 49/462 |
| 3,653,305 A | 4/1972 | Triestle et al. |
| 3,871,937 A | 3/1975 | Hollingsead et al. |
| 3,883,993 A | 5/1975 | Pullan |
| 4,143,904 A | 3/1979 | Cooper et al. |
| 4,246,303 A | 1/1981 | Townsend |
| 4,441,301 A | 4/1984 | Benson |
| 4,470,608 A | 9/1984 | Warren |

(Continued)

Primary Examiner—H. Gutman
(74) Attorney, Agent, or Firm—Robert C. Freed; Moore, Hansen & Sumner

(57) ABSTRACT

A sealing gasket for sealing gaps adjacent to a pickup truck is provided. In alternate embodiments a combination pickup truck and sealing gasket is also provided. The sealing gasket of the present invention comprises an elongated member made of a deformable and a somewhat resilient polymeric material. The polymeric material is preferably a closed cell sponge material made of one of a number of polymeric materials which are the somewhat flexible, resilient, water resistant and the like. The cross-section of the elongated member, if divided into two parts, includes a generally triangular portion and a generally semi-circular portion which come together to form a teardrop-like shape. The elongated member preferably has a first lumen which is generally circular in shape when the sealing gasket is undeformed, and preferably a second lumen which has two converging tear surfaces which converge to join at one end and join to an arcuate inner surface at the other end. This sealing gasket is uniquely designed to be both resilient and deformable in a manner which enables the sealing gasket to be used in a variety of different orientations and positions to seal gaps between a pickup truck tailgate and other portions of the pickup truck through which dust and moisture may pass if the gaps are not filled.

15 Claims, 2 Drawing Sheets

U.S. PATENT DOCUMENTS

| | | |
|---|---|---|
| 4,617,220 A | 10/1986 | Ginster |
| 4,687,127 A | 8/1987 | Pardo et al. |
| 4,761,917 A | 8/1988 | Knecht et al. |
| 4,807,397 A | 2/1989 | Doan |
| 4,858,385 A | 8/1989 | Bright |
| 4,923,074 A | 5/1990 | Johnston |
| 5,011,163 A | 4/1991 | Hermann et al. |
| RE33,790 E | 1/1992 | Huber |
| 5,083,829 A | 1/1992 | Fonesca |
| 5,462,292 A | 10/1995 | Yamane |
| 5,516,185 A | 5/1996 | O'Donnell et al. |
| 5,702,147 A | 12/1997 | Essig |
| 5,840,401 A * | 11/1998 | Baesecke .................. 428/122 |
| 6,007,133 A * | 12/1999 | Heim et al. .................. 296/56 |
| 6,075,205 A * | 6/2000 | Zhang .................. 174/35 GC |
| 6,086,709 A | 7/2000 | Hills |
| 6,126,173 A * | 10/2000 | Westhoff et al. ............ 277/615 |
| 6,158,171 A | 12/2000 | Kellogg et al. |
| 6,170,724 B1 | 1/2001 | Carter et al. |
| 6,287,669 B1 * | 9/2001 | George et al. .............. 428/156 |
| 6,336,640 B1 * | 1/2002 | Knapp ....................... 277/206 |
| 6,474,654 B1 * | 11/2002 | Schmeichel ................ 277/630 |
| 6,485,030 B1 * | 11/2002 | Hahn et al. ................. 277/645 |
| 6,595,525 B2 * | 7/2003 | Schmidt ..................... 277/630 |
| 6,773,019 B2 * | 8/2004 | Schmeichel ................ 277/630 |

* cited by examiner

FIG. 4
FIG. 5
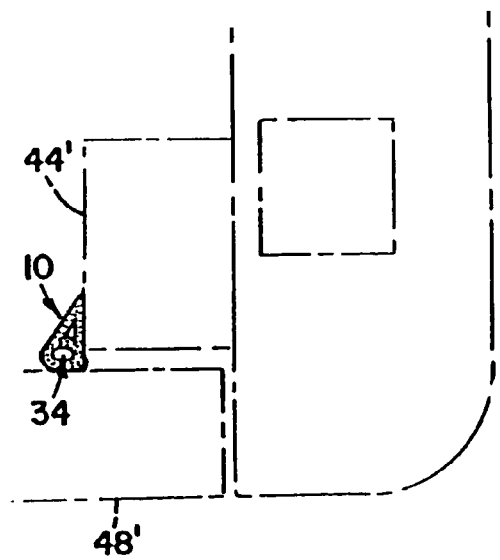
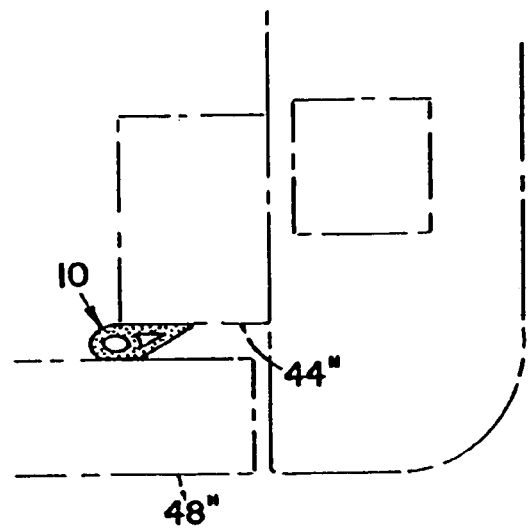
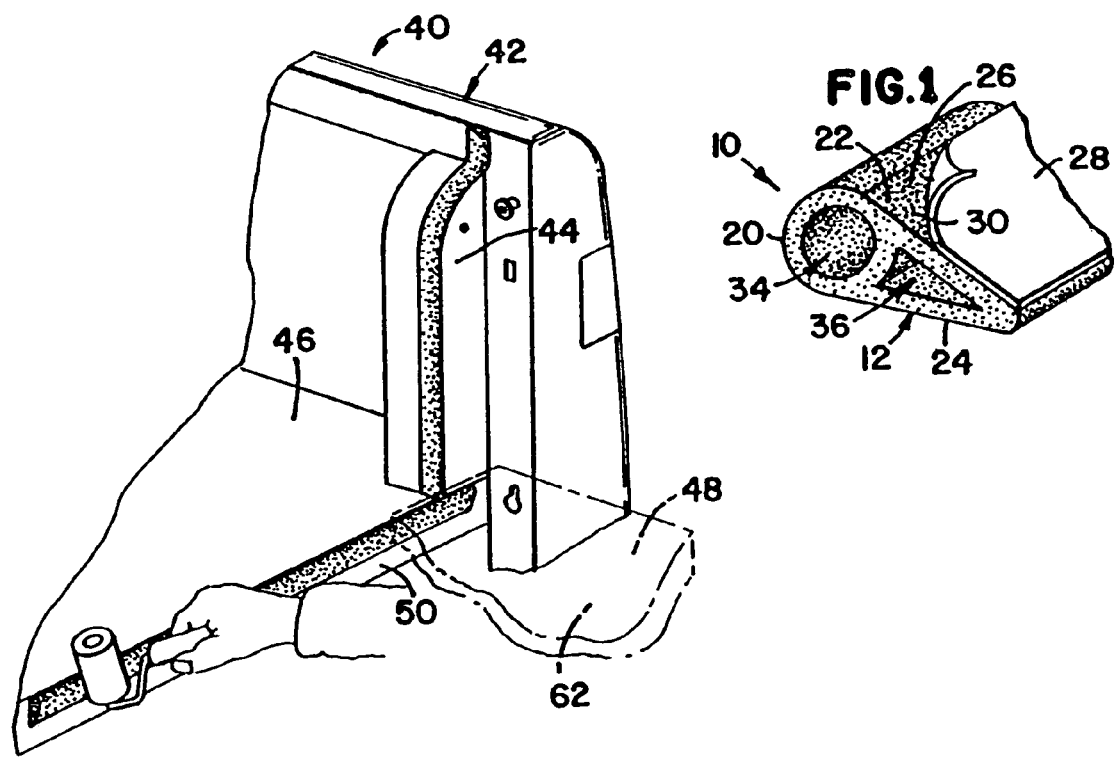
FIG. 2

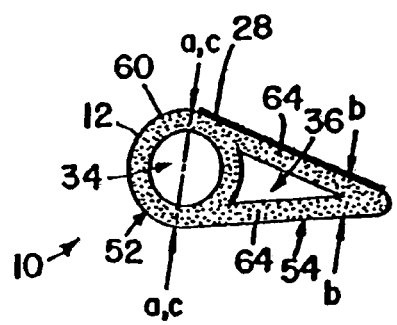
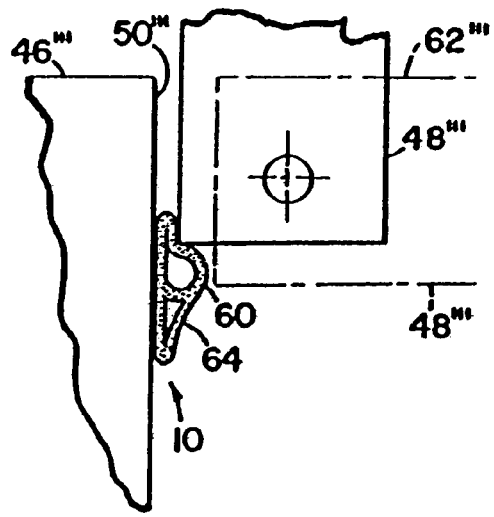
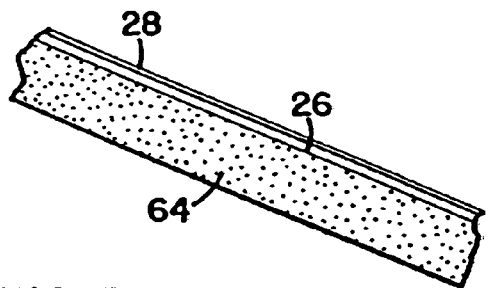
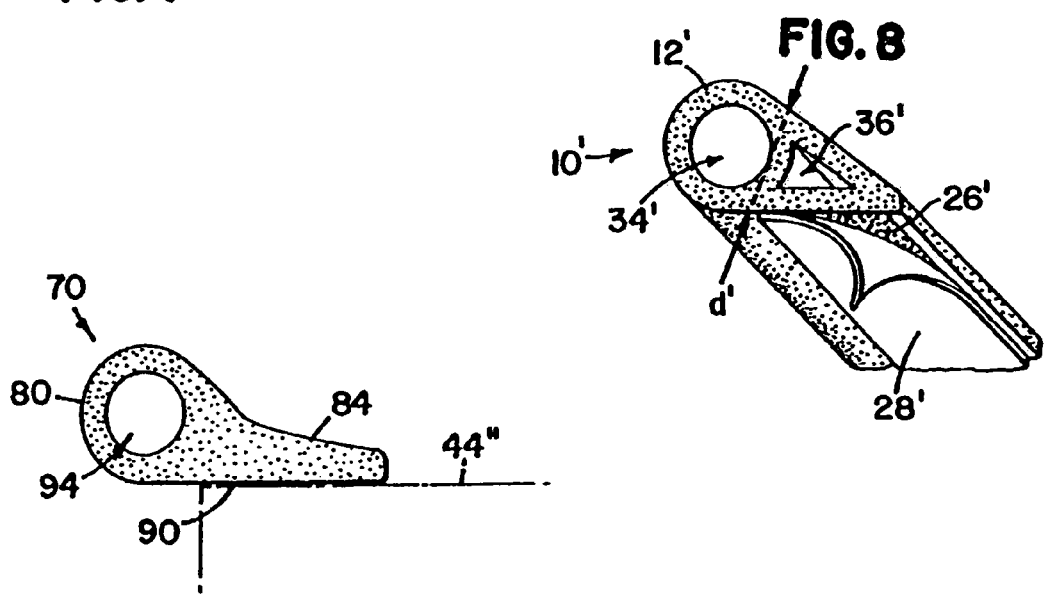

US 6,959,848 B2

TAILGATE SEALING GASKET

RELATED APPLICATIONS

The present application is a continuation application of U.S. patent application Ser. No. 10/251,284 filed Sep. 20, 2002, now U.S. Pat. No. 6,773.019, which is a continuation of application U.S. patent application Ser. No. 09/590,547 filed Jun. 8, 2000, now U.S. Pat. No. 6,474,654, each entitled TAILGATE SEALING GASKET.

FIELD OF INVENTION

The field of the present invention relates to devices for sealing gaps between pickup truck tailgates and the body of the pickup truck.

BACKGROUND OF THE INVENTION

In today's world, pickup trucks are becoming ever more popular as people with a variety of interests find them both versatile and convenient for the many activities in which they may participate. The trucks have a cargo carrying capacity which is good for many purposes and the trucks may go virtually anywhere whether the roadway is paved or not. This convenience and versatility has made pickup trucks a popular component of modern living.

The cargo box of modern pickup trucks is often equipped with a tonneau cover or a topper which are secured to the cargo box. Modern tonneau covers and toppers enclose the cargo box so that rain and snow do not fall into the truck bed. Even when truck beds are covered, however, dust from paved and un-paved roads often finds its way into the cargo box through either gaps between the tailgate and the end of the bottom of the truck bed or between the tailgate and the respective side panels of the cargo box. These gaps are generally present in virtually all pickup trucks.

In order to close these gaps to reduce the flow of air which may carry dust or unwanted moisture into the cargo box, tailgate sealing gaskets have been created to fill gaps between the tailgate and the respective side walls and the tailgate and the end of the bottom of the truck bed. These sealing gaskets have taken many different forms, and are made of many different materials but over time they deform and become brittle so that they must be replaced. The most common gasket is a simple elongated tube-like gasket. This type of gasket is generally secured to the pickup truck on one side. When the tail gate is closed, however, it flattens out without support. Other sealing gaskets are configured in a way which only allows them to accommodate certain predictable gaps that may be envisioned by the maker, but not others. Because these gaskets are only configured to fill gaps in only a certain way, they do not generally meet all needs for all truck body types. Yet others are solid gaskets without any lumen to provide give. It will be appreciated that it would be advantageous to provide a sealing gasket which will adequately fill the gaps between the tailgate and the respect side panels and the surface of the truck bed, especially one which would fill such gaps for a wide variety of truck body types having different configurations.

Accordingly, it will be appreciated that there is a continuing need for new and improved tailgate sealing gaskets that will benefit owners of pickup trucks by providing a gasket which will provide a better seal for closing gaps between the tailgate and the truck body. The present invention provides advantages over the prior devices and the prior methods used to close such gaps, and also offers other advantages over the prior art and solves other problems associated therewith.

SUMMARY OF THE INVENTION

A tailgate seal or sealing gasket is provided which is designed to be used to seal gaps between a pickup truck tailgate and side panels of a pickup truck cargo box and between the tailgate and the end of the bottom surface of the truck bed of the cargo box. This sealing gasket has a shape which allows it to be especially versatile in that it can be used to fill gaps having numerous configuration and can be oriented in many ways to fill such gaps. The present tailgate seal includes an elongated member made of a deformable and at least somewhat resilient polymeric material. The elongated member defines a first lumen passing through at least a first length of the elongated member. The elongated member has a first undeformed configuration in which a first cross-section of the elongated member, which extends through the elongated member perpendicular to the first length, has two portions, a first portion shaped generally like a triangle having two converging sides of equal length and a second portion shaped generally like a semi-circle; the elongated member having a plurality of outer surfaces, the first outer surface being a generally curved surface located at a first end of the first cross section, and the second and third outer surfaces being generally flat surfaces which extend away from the first end towards a second end of the first cross section. The first outer surface is curved toward and preferably joins with the second and third outer surfaces, respectively, at opposite ends of the first surface. The second and third outer surfaces generally converge toward one another as they extend away from the first outer surface, such that they come closer together so that the first cross section is smaller in width at the second end than it is at the junction between the first outer surface and the second and third outer surfaces. In preferred embodiments, the first lumen is defined by a generally curved inner surface and the elongated member defines a second lumen passing through at least the first length of the elongated member. The second lumen is preferably defined by three inner surfaces, a generally arcuate inner surface and two generally flat inner surfaces which converge together as they extend away from the generally arcuate inner surface. Structurally, the generally arcuate inner surface need not be arcuate and could, just as practically be a flat surface or an arcuate surface, whether convex or concave in orientation. Similarly, the generally flat inner surfaces can be somewhat curved. The elongated member is preferably deformable so that the first configuration can be deformed such that the first lumen will have a different cross-sectional shape than that of the first lumen in the first configuration. In preferred embodiments, the polymeric material is preferably an extruded polymeric closed cell sponge material containing microscopic pockets preferably containing a gas such as air or the like. Preferably, the elongated member further includes an adhesive strip along a generally flat outer surface, either the second and third outer surface. The adhesive strip provides a sealant for preferred sealing gaskets which is used to secure the sealing gasket to the pickup truck. In certain embodiments, the adhesive strip extends from one side of the flat outer surface alternately up to a junction between the flat outer surface and the first outer surface which is a curved surface. In preferred embodiments, this strip will end just short of this junction (see FIG. 3), and in more preferred embodiments, this strip will end well before this junction (see FIG. 8) so that the rounded end of the gasket can be extended well beyond the edge of any surface on the pickup truck to which it is attached. Other embodiments of the present invention provide a combination pickup truck and sealing gasket, the sealing gasket being the same as that described herein above in this paragraph.

The present tailgate sealing gasket is preferably made of a closed cell sponge material made from natural rubber, Styrene Butadiene Rubber (SBR), Nitrile, Ethylene Propylene Diene Monomer (EPDM) copolymers, Neoprene®, Silicone or the like; most preferably EPDM copolymers.

The preferred embodiments of the present invention provide significant advantages over prior art. The adhesive strip on the generally flat outer surface of the gasket provides a convenient mechanism for sealing the gasket to various surfaces on the truck so that the first lumen which is preferably greater in cross-sectional width than the second lumen can be placed advantageously to close gaps between the various parts of the truck and the tailgate. As shown in the drawings, this can be done in a number of ways to take advantage of the shape of the gasket. Because the gasket is made of a resilient closed cell sponge material, the tailgate can be opened and closed many times before the gasket begins to keep the shape it has when the gasket is deformed and the tailgate is closed. In any case, it will continue to fill the gap between the tailgate and the various parts of the truck body and prevent dust and other particles from entering the truck bed.

It is an object of the present invention to provide a tailgate sealing gasket which is superior to other gaskets because of its versatility. The present tailgate gasket may be sealed to the truck in one of several orientations which provides a functional seal of the gaps between the tailgate and various parts of the truck body.

It is another object of preferred embodiments of the present invention to provide an adhesive strip which is easily applied to the truck, thereby providing convenience for the user.

Still further objects and advantages of the present invention will become apparent from a consideration of the ensuing description and accompanying drawings.

These and various other advantages and features of novelty that characterize the present invention are pointed out with particularity in the claims annexed hereto informing a part hereof. However, for a better understanding of the present invention, its advantages and other objects obtained by its use, reference should be made to the drawings, which form a further part hereof and to the accompanying descriptive matter, in which there is illustrated and described preferred embodiments of the present invention.

BRIEF DESCRIPTION OF THE DRAWINGS

The invention will be further described in connection with the accompanying drawings, in which:

FIG. 1 is a perspective view of a sealing gasket of the present invention showing a protective strip being peeled away from an adhesive strip along a generally flat outer surface of the elongated member;

FIG. 2 is a perspective view of broken-away portions of a pickup truck to which a sealing gasket similar to that shown in FIG. 1 has been attached;

FIG. 3 is a horizontal cross-sectional view of the elongated sealing gasket shown in FIG. 1;

FIG. 4 is a schematic plan view from above a truck bed or cargo box of a pickup truck (shown in phantom) similar to the pickup shown in FIG. 2, but when the tailgate is closed and the sealing gasket is secured to a portion of the side panel of the cargo box and the sealing gasket fills a gap between the side panel and the tailgate;

FIG. 5 is a schematic view similar to that shown in FIG. 4 except that the configuration of the cargo box (shown in phantom) is slightly different to allow for a larger gap between an alternate tailgate and an alternate side panel of the cargo box and the sealing gasket is turned end for end with respect to the sealing gasket shown in FIG. 4 and is placed in a different position and fills the resulting gap between the alternate side panel and the alternate tailgate in a different manner;

FIG. 6 is a partially broken away schematic side view of a sealing gasket of the present invention, like that shown in FIGS. 1 and 3, attached to an end of a truck bed when the tailgate is closed and the sealing gasket is shown in a deformed configuration having a first cross section and also showing the tailgate in an open position in phantom;

FIG. 7 is an enlarged fragmentary portion of the structural support wall 64, shown in FIG. 3, showing the adhesive strip 26 and the protective covering 28 attached to the structural support wall 64;

FIG. 8 is a perspective view of an alternate embodiment of the sealing gasket of the present invention having a narrower adhesive strip so that the adhesive strip can be fully secured to a pickup truck surface, and allow the alternate gasket to extend somewhat further beyond the edge of such surface than might be possible with the gasket shown in FIG. 3; and FIG. 9 is a horizontal cross-sectional view similar to that shown in FIG. 3, but of a further alternate embodiment of the sealing gasket 70 of the present invention having only a single lumen 94 and a "collapsed" structural support wall 84 which is essentially one with the opposite support wall to which the adhesive strip 90 is attached; the alternate gasket is secured to a pickup truck surface 44", shown in phantom.

DETAILED DESCRIPTION OF THE PREFERRED EMBODIMENTS

Referring now to the drawings and to FIG. 1 in particular, the tailgate sealing gasket 10 of the present intention is shown. The deformable sealing gasket 10 includes an elongated member 12 having a first arcuate outer surface 20 and second and third flat outer surfaces 22 and 24. The second outer surface 22 is at least partially covered by an adhesive strip 26 which is preferably heat sealed to the flat surface 22 and a protective polymeric strip 28 is releasably attached to the open surface 30 of the adhesive strip 26. The elongated member 12 has a first generally circular lumen 34, when the elongated member is in an undeformed position as shown, which extends through at least a portion of the elongated member, preferably the entire elongated member 12, and preferably a second lumen 36 which has a cross-sectional shape generally in the shape of a triangle.

Referring now also to FIG. 2, the protective strip 28 is removed in order to secure the open surface 30 of the adhesive strip 26 to surfaces within a cargo box 42 of a pickup truck 40. The cargo box 42 is shown having sidewalls 44, a truck bed 46 and a tailgate 48 having an inside surface 62. The tailgate sealing gasket 10 is applied to the side wall 44 and an end 50 of the truck bed 46 by removing the protective strip 28 from the preferred sealing gasket 10 and pressing the adhesive strip 26 against the respective surfaces of the sidewall 44 or the end 50 of the truck bed 46. The gasket 10 is placed so that the gasket 10 will fill pre-existing gaps between the tailgate 48 and the side wall 44 and the tailgate 48 and the end 50 of the truck bed 46, and reduce air-flow into the cargo box 42 through such gaps.

Referring now to FIGS. 4 and 5 it will be appreciated that the gasket 10 may be secured to alternate side panels 44' and 44'' in different manners. For instance, in FIG. 4 the sealing gasket 10 is secured using the adhesive strip 26 in a manner in which the tailgate 48' will compress and deform the generally circular lumen 34 when the tailgate 48' is in the closed position. In FIG. 5, the gasket 10 is positioned in a different way to fill an alternate gap in a different manner.

Referring now also to FIG. 3, the deformable sealing gasket 10 is shown in cross-section. The cross-sectional shape of the elongated member 12 can be divided into portions separated by dashed line c—c; a first semicircular portion 52 and a second generally triangular portion 54 which combine to form a generally teardrop-shaped cross-sectional shape. The width of the elongated member 12 is larger when measured proximate the generally circular lumen 34 between arrows a—a, than when measured near the end of the triangular portion 54 where the sides have generally converged together between arrows b—b. It will be appreciated that the side walls 64 of the elongated member 12 proximate the second and third outer surfaces 22, 24 support the generally circular structural wall 60 which surrounds the generally circular inner lumen 34. The support provided by the side walls 64 allows the generally circular structural wall 60 to roll away from deforming pressure and still find at least some support from the adjacent structural side walls 64. When the circular portion 60 is deformed as shown in FIG. 6, the structural sidewall 64 tends to "bow" inward as shown. As the circular portion 60 is pushed further over toward the triangular portion 54, the side wall 64 bows further (not shown) until the second lumen 36 is virtually closed off.

Referring now also to FIG. 6, the gasket 10 is generally secured to the end 50''' of a truck bed 46''' so that the gasket 10 does not rise above the edge of, and is fully below the top surface of, the truck bed 46''' which is generally even with the inside surface 62''' of tailgate 48'''. When the tailgate 48''' is pivoted to the closed position as shown in FIG. 6, the first portion of the elongated member 12 is generally deformed, as is the third flat outer surface 24 which is opposite the second flat outside surface 22 which is secured to the end 50''' of the truck bed 46'''.

Referring now also to FIG. 7, an enlarged broken-away cross-sectional view of the second flat outside surface shows that the adhesive strip 26 is preferably a single layer of adhesive. The adhesive strip 26 is preferably secured to the outer surface 22 using hot air. In preferred embodiments, the air temperature of the hot air is about 1200° F. In preferred embodiments, the adhesive strip is a Scotch brand tape product called Very High Bond (VHB) Foam Tape from 3M Company, St. Paul, Minn. Although the structural walls of the elongated member 12 may be made of any of the polymeric materials listed herein above, and any similar or comparable polymers, the DPDM copolymer products are most preferable in view of their reasonable cost and appropriate properties including resistance to water. Where oil will be present, a Neoprene® closed cell sponge may be used. Neoprene® is purchased from DuPont.

Referring now also to FIG. 8, a further embodiment of the present sealing gasket 10' is shown having a somewhat different cross-sectional shape, a narrower protective strip 28' which is covering adhesive strip 26'. The protective strip 28' and the adhesive strip 26' extend only up to an imaginary line d' which marks the inside wall of the first lumen 34'. The narrower adhesive strip 26' is employed to allow the gasket 10' to be completely secured to a pickup truck surface (not shown) and still extend well beyond the edge of such surface in a manner shown in FIG. 9 while placing yet another gasket 70 on a pickup truck surface 44'' (shown in phantom).

In FIG. 9, this further embodiment of the sealing gasket 70 is shown in cross-section. This gasket 70 has a single lumen 94 having a generally circular cross-section when undeformed as shown in FIG. 9. This gasket 70 has a "collapsed" support wall 84 which is similar to the support wall 64 of the gasket 10 shown in FIG. 3, except that it is not really separate from or distinguishable from the support wall on the other outside surface which extends away from the first lumen 94, the surface to which the adhesive strip 90 is attached. As shown, the adhesive strip 90 secures the gasket to the surface 44'' of the pickup truck. As with the other embodiments, this embodiment has a curved outer support wall 80 at one end of the cross section of the gasket 70, and two remaining surfaces which become closer and closer together as they extend away from the curved outer support wall 80 proximate one end of the first lumen 94. In each embodiment, these support walls, the surfaces of which draw closer and closer to one another as they extend away from the respective first lumen (34, 34' and 94), provide support for the walls surrounding the first lumen so that the portion of the gaskets most immediately surrounding the first lumen does not "flop" easily over to one side or the other when this portion of the gasket is deform thereby providing more resistance to deformation and making the preferred gaskets more effective at filling the gaps for which the respective embodiments are designed to fill.

Although the description above contains many specifications, these should not be construed as limiting the scope of the invention but as merely providing illustrations of some of the presently preferred embodiments of this invention.

It is to be understood, therefore, that even though numerous characteristics and advantages of the present invention have been set forth in the foregoing description, together with details of the structure and function of present invention, the sequence or order of the specific steps, or the actual compositions or materials used may vary somewhat. Further more, it will be appreciated that this disclosure is illustrative only and that changes may be made in detail, especially in matters of shape, size, arrangement of parts or sequence or elements of aspects of the invention within the principles of the invention to the full extent indicated by the broad general meaning of the terms in which the appended claims are expressed. While a preferred embodiment of the present invention has been shown and described herein, it should be understood that the described embodiment is presently contemplated to be a best or preferred mode for carrying out the invention only and in actual practice can be varied and changes made thereto, without departing from the subject matter coming within the scope of the following claims, which are presently claimed herein.

What is claimed is:

1. A sealing gasket for sealing gaps, the sealing gasket comprising:

an elongated member made of a deformable and at least somewhat resilient polymeric material; the elongated member defining first and second lumens passing through at least a first length of the elongated member; the elongated member having a first undeformed configuration in which a first cross-section of the elongated member, perpendicular to the first length, has two portions, a first triangular portion having two converging sides of generally equal length and a second semicircular portion shaped generally like a semi-circle, which combine to form a generally teardrop-shaped cross-sectional shape; the first lumen having a generally rounded cross-sectional shape when the elongated member is in the first undeformed configuration; wherein the elongated member has a plurality of outer surfaces, a first outer surface being a generally curved surface located at a first end of the first cross-section proximate the generally semi-circular-shaped second portion, and second and third outer surfaces being generally flat surfaces which extend away from the first end along the converging sides of the generally triangularly-shaped first portion towards a second end of the first cross-section where the converging sides meet, the first outer surface being curved toward the second and third outer surfaces at opposite ends of the first outer surface, and the second and third outer surfaces generally converging toward one another as they extend away from the first outer surface such that they come closer together so that the first cross-section is smaller in width at the second end than at a junction between the first outer surface and the second and third outer surfaces, the second lumen having a narrowing cross-sectional shape when the elongated member is in the undeformed configuration.

2. The sealing gasket of claim 1, the second lumen having a generally triangular cross-sectional shape when the elongated member is in the first undeformed configuration, except that a first side of the generally triangular cross-sectional shape of the second lumen, proximate an internal wall separating the first lumen from the second lumen, is generally rounded so as to conform generally to the rounded of the first lumen, which shape is generally partially reciprocated by the first side.

3. The sealing gasket of claim 2, wherein the second lumen is defined by three inner surfaces, a generally arcuate inner surface proximate the first side of the second lumen and two generally flat inner surfaces which converge together as each flat inner surface extends away from the generally arcuate inner surface.

4. The sealing gasket of claim 1, wherein the elongated member is deformable so that the first configuration can be deformed such that the first lumen will have a different cross-sectional shape than that of the first lumen in the first configuration.

5. The sealing gasket of claim 1, the polymeric material being a closed cell sponge material; wherein the polymeric material is an extruded polymeric material which contains microscopic pockets containing a gas.

6. The sealing gasket of claim 1, the elongated member further comprising an adhesive strip along a generally flat outer surface selected from the group consisting of the second and third outer surfaces, the adhesive strip providing a sealant for adherence.

7. The sealing gasket of claim 6, wherein the adhesive strip extends up to a junction between the first outer surface and a flat outer surface selected from the group consisting of the second outer surface and the third outer surface.

8. A combination pickup truck and sealing gasket comprising:
a pickup truck having a cargo box including a truck bed, a pair of side panels and a tailgate, the tailgate having an opened and a closed position with respect to a truck bed and the respective side panels; and a sealing gasket secured to the pickup truck to fill gaps existing between the tailgate and at least one of the group consisting of an end of the truck bed and one of the respective side panels; the sealing gasket including an elongated member made of a deformable and at least somewhat resilient polymeric material, the elongated member defining first and second lumens passing through at least a first length of the elongated member; the elongated member having a first undeformed configuration in which a first cross-section of the elongated member, perpendicular to the first length, has two portions, a first triangular portion having two converging sides of generally equal length and a second semi-circular portion shaped generally like a semi-circle, which combine to form a generally teardrop-shaped cross-sectional shape; the first lumen having a generally rounded cross-sectional shape when the elongated member is in the first undeformed configuration; wherein the elongated member has a plurality of outer surfaces, a first outer surface being a generally curved surface located at a first end of the first cross-section proximate the generally semi-circular-shaped second portion, and second and third outer surfaces being generally flat surfaces which extend away from the first end along the converging sides of the generally triangularly-shaped first portion towards a second end of the first cross-section where the converging sides meet, the first outer surface being curved toward the second and third outer surfaces at opposite ends of the first outer surface, and the second and third outer surfaces generally converging toward one another as they extend away from the first outer surface such that they come closer together so that the first cross-section is smaller in width at the second end than at a junction between the first outer surface and the second and third outer surfaces, the second lumen having a narrowing cross-sectional shape when the elongated member is in the undeformed configuration.

9. The combination pickup truck and sealing gasket of claim 8, the second lumen having a generally triangular cross-sectional shape when the elongated member is in the first undeformed configuration, except that a first side of the generally triangular cross-sectional shape of the second lumen, proximate an internal wall separating the first lumen from the second lumen, is generally rounded so as to conform generally to the rounded shape of the first lumen, which is generally partially reciprocated by the first side.

10. The combination pickup truck and sealing gasket of claim 9, wherein the second lumen is defined by three inner surfaces, a generally arcuate inner surface proximate the first side of the second lumen and two generally flat inner surfaces which converge together as each flat inner surface extends away from the generally arcuate inner surface.

11. The combination pickup truck and sealing gasket of claim 8, wherein the elongated member is deformable so that the first configuration can be deformed such that the first lumen will have a different cross-sectional shape than that of the first lumen in the first configuration.

12. The combination pickup truck and sealing gasket of claim 8, the polymeric material being a closed cell sponge material; wherein the polymeric material is an extruded polymeric material which contains microscopic pockets containing a gas.

13. The combination pickup truck and sealing gasket of claim 8, the elongated member further comprising an adhesive strip along a generally flat outer surface selected from the group consisting of the second and third outer surfaces, the adhesive strip providing a sealant for adhering to the pickup truck.

14. The combination pickup truck and sealing gasket of claim 13, wherein the adhesive strip extends up to a junction between the flat outer surface and the first outer surface.

15. A method of sealing gaps between parts of a pick-up truck cargo box having a tailgate that can be oriented in a closed position and in an open position; the method comprising:

providing a sealing gasket; the sealing gasket including an elongated member made of a deformable and at least somewhat resilient polymeric material; defining first and second lumens passing through at least a first length of the elongated member; the elongated member having a first undeformed configuration in which a first cross-section of the elongated member, perpendicular to the first length, has two portions, a first triangular portion having two converging sides of generally equal length and a second semi-circular portion shaped generally like a semi-circle, which combine to form a generally teardrop-shaped cross-sectional shape, the second lumen having a narrowing cross-sectional shape when the elongated member is in the undeformed configuration, the first lumen having a generally rounded cross-sectional shape when the elongated member is in the first undeformed configuration; the elongated member further comprising an adhesive strip along a generally flat outer surface selected from the group consisting of the second and third outer surfaces, the adhesive strip providing a sealant for adherence; and sealing the adhesive strip a first portion of the pick-up truck cargo box in such a position that the sealing gasket will come into contact with a second portion of the pick-up truck cargo box when the tailgate is in a closed position;

selecting an appropriate first length of the sealing gasket for application to a first part of the pick-up truck; and sealing the first length of the sealing gasket to the first part of the pick-up such that the first length of the sealing gasket is positioned to fill a first gap between the first part of the pick-up truck and a second part of the pick-up truck when the tail gate is in the closed position.

\* \* \* \* \*

UNITED STATES PATENT AND TRADEMARK OFFICE
CERTIFICATE OF CORRECTION

PATENT NO. : 6,959,848 B2
APPLICATION NO. : 10/872036
DATED : November 1, 2005
INVENTOR(S) : Schmeichel It is certified that error appears in the above-identified patent and that said Letters Patent is hereby corrected as shown below:

At Column 7, Line 31, please insert --shape-- after "rounded".

At Column 8, Line 44, please insert --shape-- after "which".

Signed and Sealed this

Twenty-fourth Day of July, 2007

JON W. DUDAS
*Director of the United States Patent and Trademark Office*